United States Patent
Cai et al.

(10) Patent No.: US 8,566,811 B2
(45) Date of Patent: Oct. 22, 2013

(54) FINE-GRAINED PERFORMANCE CONFIGURATION OF APPLICATION

(75) Inventors: Jun J. Cai, Shanghai (CN); Jing Lv, Shanghai (CN); Yue H. Wu, Shanghai (CN); Rui Z. Xu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 13/172,388

(22) Filed: Jun. 29, 2011

(65) Prior Publication Data

US 2012/0084762 A1 Apr. 5, 2012

(30) Foreign Application Priority Data

Sep. 30, 2010 (CN) .......................... 2010 1 0506468

(51) Int. Cl.
*G06F 15/173* (2006.01)
*G06F 3/00* (2006.01)
*G06F 9/00* (2006.01)
*G06F 9/24* (2006.01)
*G06F 9/45* (2006.01)

(52) U.S. Cl.
USPC ............... 717/151; 709/223; 710/10; 710/15; 713/1; 717/140; 717/148; 717/152

(58) Field of Classification Search
None
See application file for complete search history.

(56) References Cited

U.S. PATENT DOCUMENTS

| | | | |
|---|---|---|---|
| 6,192,470 B1 * | 2/2001 | Kelley et al. ...................... 713/1 |
| 6,263,382 B1 * | 7/2001 | Bartlett et al. .................. 710/10 |
| 6,353,884 B1 * | 3/2002 | Schmitz et al. ................... 713/1 |
| 6,412,107 B1 * | 6/2002 | Cyran et al. ................... 717/148 |
| 6,487,714 B1 | 11/2002 | Azagury et al. |
| 6,675,377 B1 * | 1/2004 | Tanaka .......................... 717/152 |
| 7,117,489 B2 * | 10/2006 | Wallman et al. .............. 717/148 |
| 7,458,067 B1 * | 11/2008 | Tirumalai et al. ............. 717/140 |
| 7,543,282 B2 * | 6/2009 | Chou ............................. 717/151 |
| 7,757,013 B1 * | 7/2010 | Lawson et al. .................. 710/15 |
| 2002/0152297 A1 * | 10/2002 | Lebourg et al. ............... 709/223 |
| 2003/0018958 A1 * | 1/2003 | Wallman et al. .............. 717/148 |
| 2006/0005177 A1 | 1/2006 | Atkin et al. |
| 2009/0271775 A1 | 10/2009 | Barsness et al. |

OTHER PUBLICATIONS

Laurence Tratt, A Change Propagating Model Transformation Language, Aug. 13, 2006, [Retrieved on Jun. 6, 2013]. Retrieved from the internet: <URL: http://tratt.net/laurie/research/pubs/papers/tratt_a_change_propagating_model_transformation_language.pdf> 40 Pages (1-40).*

* cited by examiner

*Primary Examiner* — Don Wong
*Assistant Examiner* — Anibal Rivera
(74) *Attorney, Agent, or Firm* — Anthony V S England; Ingrid M. Foerster

(57) ABSTRACT

A method, system and computer program product for performance configuration of an application by setting at least one performance preference for a performance-sensitive class in the application, specifying performance preference propagation policy of the class in the application based on the at least one performance preference, and calling the class to perform performance configuration for application according to the performance preference propagation policy.

24 Claims, 3 Drawing Sheets

FINE-GRAINED PERFORMANCE CONFIGURATION OF APPLICATION

CROSS-REFERENCE TO RELATED APPLICATIONS

This invention claims priority to the foreign application 201010506468.X filed Sep. 30, 2010 in China.

BACKGROUND

1. Field

The invention relates to a computing environment. More particularly to a computer program, method, and system for achieving fine-grained performance configuration of an application.

2. General Background

Object-oriented programming (OOP) is a programming paradigm using "objects" including the data and their methods to design applications and computer programs. An individual routine may form a subprogram that can encapsulate data and perform a function isolated from other subprograms. The separation between different objects improves reusability, flexibility, and extension of software. For the purpose of achieving a complete function, each object can receive information, process data and send information to other objects.

In object-oriented programming, a class is usually used to encapsulate a specific function or provide a blueprint that may be used for creating an object. It describes features and methods common to the created objects. All data and code contained in an object can be constructed by an instance of a class.

A stricter definition of a class is a cohesive packet composed of some type of specific metadata. It describes rules of behaviors of some objects, and these objects are referred to as instance of the class. A class has an interface and a structure. The interface describes how to interact with the class and its instance by a method, while the structure describes how to divide data in each instance into multiple features. A class is a specific type of object in a certain layer. A class has a representative form (meta object) at runtime, and it provides support at runtime for operating metadata relevant to the class.

There are some performance-sensitive classes, such as, collection utility classes which may have different configurations which produce different performance behaviors at runtime. Some configurations can make classes run faster but consume more memory; while some configurations can make classes consume less memory but run slower. Part of these configurations might be exposed through an Application Programming Interface (API) of a class, while other configurations may be hidden.

ArrayList in Java™ has a constructor ArrayList (initialCapacity) which allows the developer to explicitly specify the initial size of its internal data structure. (Java and all Java-based trademarks and logos are trademarks or registered trademarks of Oracle and/or its affiliates.) However, there are other hidden configurations that may affect ArrayList's performance behavior, such as the size-growth strategy and accompanying parameters, i.e., it can grow at a constant pace, with 10 in conservative cases and 100 in aggressive cases; it can also grow in a multiplying way, with 1.1 times in conservative cases and 2 times in aggressive cases. However, all these are invisible to developers.

Depending on different scenarios applied in an application, there may be different requirement for performance of the application code. For example, when a developer knows a HashMap instance will be used in a hot registry, he wants it to run faster even though that might makes it consume more memory. In the event that classA is a Daemon class used periodically, the programmer would want it to consume minimum memory even though that might makes it run slower. In other scenarios, the priority might be for the application to start up quickly.

However, currently there is no simple and unified approach to perform fine-grained performance configuration of an application to meet the requirements of the above scenarios.

SUMMARY

According to one embodiment of the invention, there is provided a computer program product for achieving performance configuration of an application. The computer program product comprises a computer readable storage medium having computer readable program code embodied therewith, The computer readable program code comprises setting an at least one performance preference for a performance-sensitive class in the application, specifying a preference propagation policy of a class in the application based on the at least one performance preference; and calling the class to perform performance configuration for the application according to the performance preference propagation policy.

According to one embodiment of the invention, there is provided a method for achieving performance configuration of application. The method comprises setting at least one performance preference for performance-sensitive class in the application; specifying performance preference propagation policy of the class in the application based on the at least one performance preference; and calling the class to perform performance configuration for the application according to the performance preference propagation policy.

According to another embodiment of the invention, there is provided a system for achieving performance configuration of an application executing on a processor. The application having an at least one performance-sensitive class. The class having an interface for setting the at least one performance-sensitive performance preference for the at least one performance-sensitive performance-sensitive class in the application. The application having an interface for setting a performance preference propagation policy of the class and utilizing the interface for setting the performance preference propagation policy of the class.

DRAWINGS

The above-mentioned features of the present invention will become more apparent with reference to the following description taken in conjunction with the accompanying drawings wherein like reference numerals denote like elements and in which.

DETAILED DESCRIPTION

Embodiments of the invention are described below with reference to drawings in detail.

Figure 1:
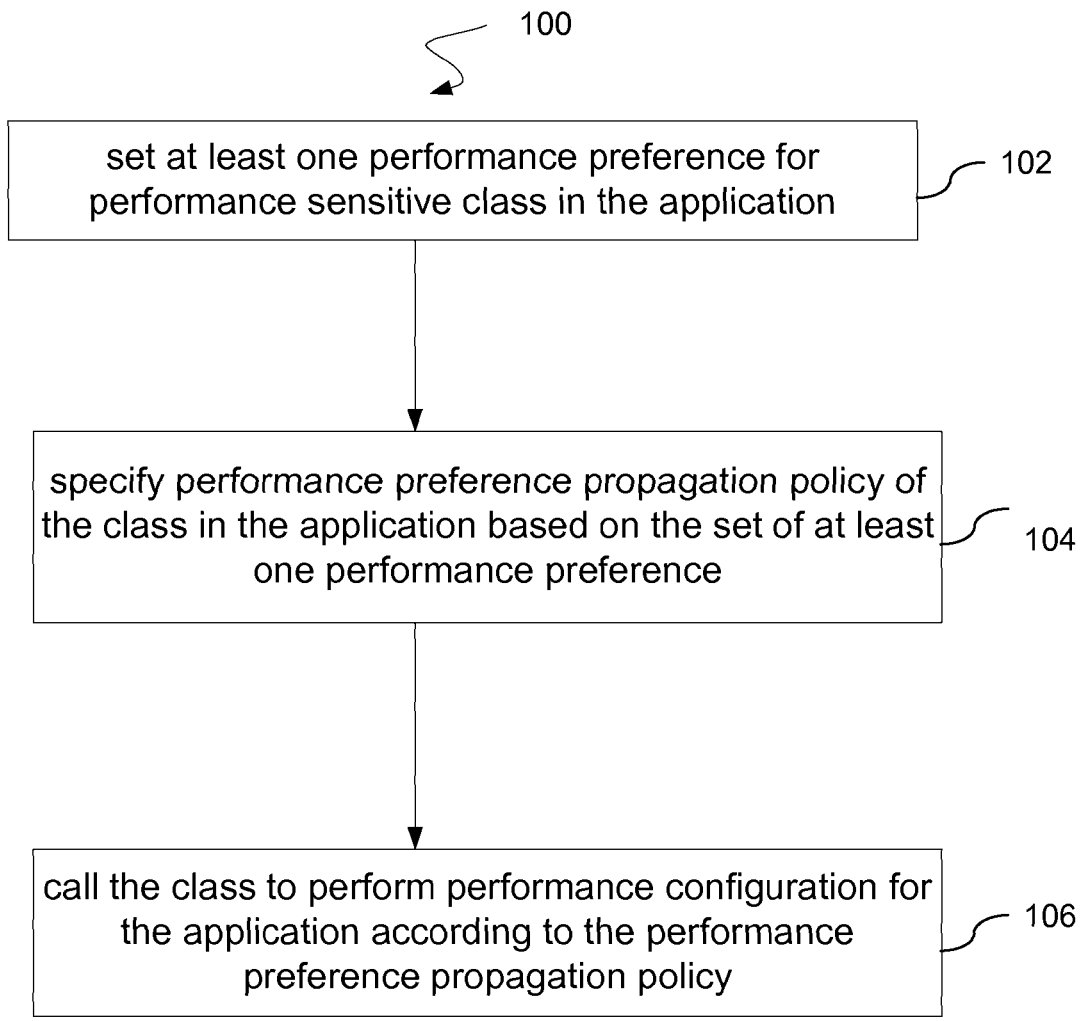
FIG. 1 illustrates a process 100 for achieving fine-grained performance configuration of application code according to one embodiment of the present invention.

In view of the deficiencies in prior art, various method, system, and computer program product embodiments of the invention are provided herein. The main idea of the invention is to provide a simple, flexible, and unified approach to achieve fine-grained performance configuration of application code. First, class libraries may be performance-aware, that is, a class may have different runtime behaviors such as optimizing for speed versus optimizing for memory and the like for different performance policies. The application developer may specify performance preferences in different scopes, including global scope, individual class scope, individual method scope, individual instance scope, and the like. At runtime, the preference propagates in the specified scope. For example, all code executed in the scope may query a current performance preference and follow the performance preference correspondingly. With the invention, the developers can be enabled to fine-configure the performance preference for the application code, configure performance at different granularity simply and flexibly, and without requiring a complex configuration for individual classes FIG. 1 illustrates a method for achieving fine-grained performance configuration of an application according to an embodiment of the invention. At process block 100, at least one performance preference is set for a performance sensitive class in the application. The performance-sensitive class may be identified and specified by class libraries developers. Alternatively, the performance-sensitive class could be identified through an automatic detection by a program. For example, class libraries developers find that ArrayList class takes up a large proportion of execution time in a large-scale application by observation, test or practical experience. With the observation that its performance affects the performance of the whole program significantly, it can then be regarded as performance-sensitive class.

For this performance-sensitive class, the set performance preference enables the identified class to be performance-aware, and examples of the performance preference can include: "Aggressively Prefer Speed", "Prefer Speed", "Normal", "Prefer Memory", "Aggressively Prefer Memory", and the like. The classes of the performance preference can be set as different performance preferences by setting different parameter values. At runtime, values corresponding to current valid preference setting are used, thereby running in a form preferred by developers. Usually, these parameter values only affect instance construction, but they can go beyond that.

For example, for class ArrayList, configuration information affecting performance and memory occupation can be found in ArrayList, and a set of parameters suitable to different performance environments are defined. In the next example, there is one default array size in ArrayList, and its initial value is 16. ArrayList can further define it as follows:

Default—Size=16
Prefer Speed—Size=128
Prefer Memory—Size=2

Thus, in the scenario of Prefer Speed, the size of the array is set as 128; and in the scenario of Prefer Memory, the size of the data is set as 2.

A Preference-aware class should have one default preference, and one or more configurable preference options. Each preference option represents a unique strategy of a class at runtime. A typical implementation is to use a configuration file as shown below. Class library developers are responsible for creating the configuration file, such that the configuration file could be transparent to application developers.

ArrayList|Prefer Speed|Var1=16,Var2=32,Var3=0.75
ArrayList|Prefer Memory|Var1=8,Var2=2,Var3=0.85
ArrayList|Default|Var1=16,Var2=16,Var3=0.75
HashMap| . . .

At a process block 104, the process 100 performance preference propagation policy of the class in the application is specified based on the set of at least one performance preference. This step is described in detail below with reference to the description of process block 204 in FIG. 2.

In step 106, the class is called to perform performance configuration of the application according to the performance preference propagation policy. This step will be described in detail below with reference to the description of step 208 in FIG. 2.

Figure 2:
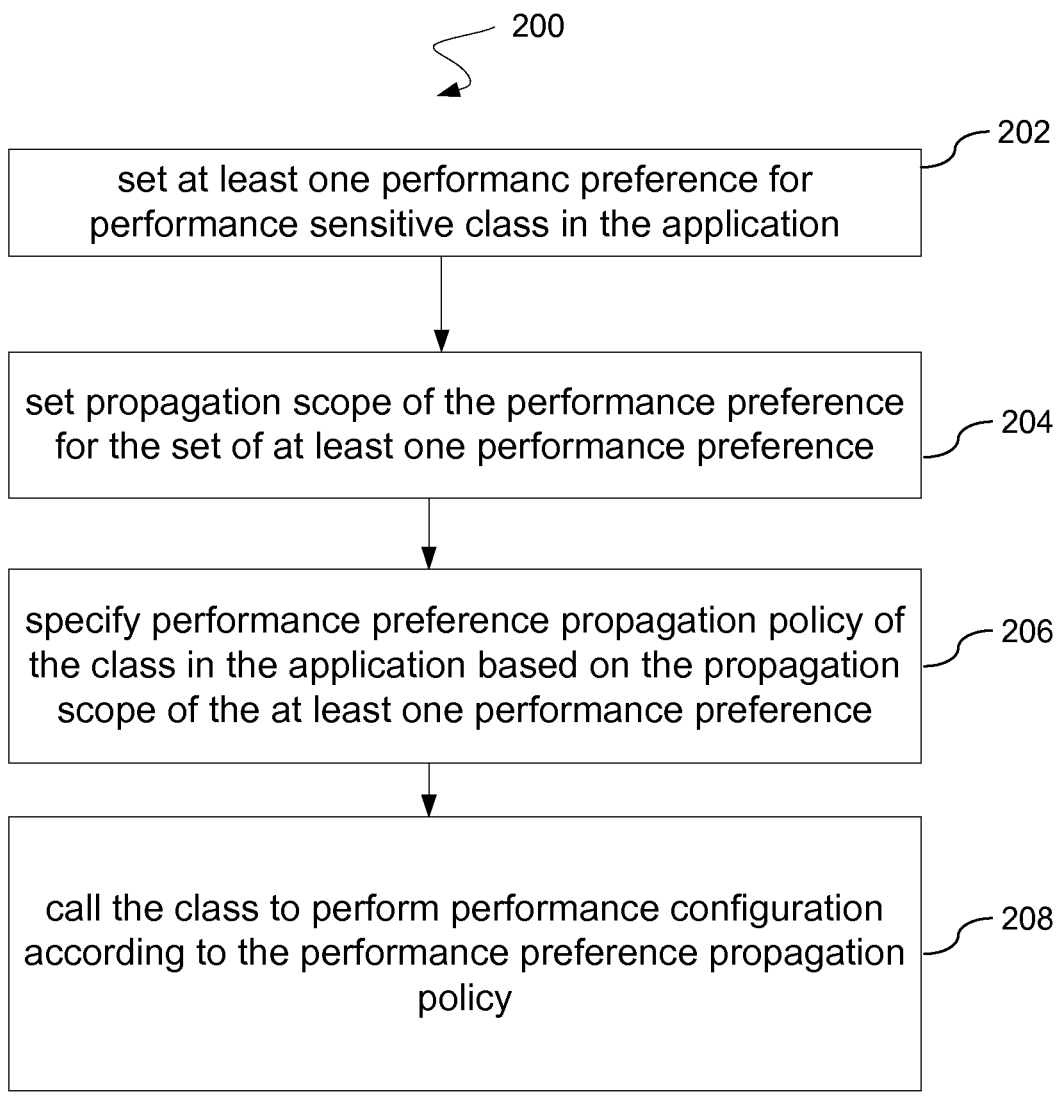
FIG. 2 illustrates a process 200 for achieving fine-grained performance configuration of application code according to another embodiment of the invention.

Another embodiment of the invention is described with reference to FIG. 2. FIG. 2 illustrates a process 200 for achieving a fine-grained performance configuration of an application according to another embodiment of the invention. At a process block 202, like the process block 102 in FIG. 1, at least one performance preference is set for a performance-sensitive class in the application.

At a process block 204, a propagation scope for the performance preference may also be set for the identified performance-sensitive class, for the at least one performance preference. The propagation scope of the performance preference may be specified by class libraries developers. For example, the scope may include global, class, method and instance from high level to low level. Scope represents a preference configuration performed on a different granularity for the whole application. According to one embodiment of the invention, preferences for a low level scope override those for a high level scope. Further, a more complex override scheme might be designed, for example, "force-global" to force the global setting, etc. According to one embodiment of the invention, the propagation scope of a performance preference could include:

a) Global Scope, representing that it functions during the entire program running period. It affects all classes and their instances. Execution follows global scope preference without any consideration for lower level scope.

b) Class Scope, representing that it functions in all methods of this class. It affects all instances of this class and objects used directly or indirectly by this class. Any invocation to any methods of this class and their referred methods follows class preference, and this class scope preference propagates downwards unless there is a performance of a lower level scope specified.

c) Method Scope, representing that it functions in invoked sub-procedures contained within this method. It affects objects used directly or indirectly by this method. Any method invoked by this method or objects created within the lifecycle of this method follows this method scope preference and they propagates downwards unless there is a method policy or instance policy specified.

d) Instance Scope, representing that it functions when a specific object instance is invoked. It affects this instance and objects used directly or indirectly by this instance.

In a process block 206, a performance preference propagation policy of the class in the application is specified based on the at least one performance preference and the performance preference propagation scope.

For example, for ArrayList, could be defined as follows:
Global=Default
ClassA=Prefer Speed
MethodB=Prefer Memory Then, in everywhere ArrayList is used in method B, size=2. In all methods of class A, size=128. In all other situations, size is globally defined as 16.

According to embodiments of the invention, the application developers may use different means to define the usage of ArrayList in the developer's own program. An example definition is as follows:

a) Performance preference propagation policy is stored in a policy configuration file.

A specific example of the policy configuration file containing performance preference propagation policy is given as follows:

ArrayList
   Scope=Global
   Prefer=Prefer Speed
   Global: Prefer Speed
   ClassA: Prefer Memory
   MethodB: Aggressively Prefer Speed
   MethodC: Prefer Memory
   InstanceD: Aggressively Prefer Speed
. . .

b) Code annotation. Performance preference propagation policy is defined separately in class files with annotations.

For example, in its own class, it is defined as follows:

```
@Prefer Speed
public class Sample{
...
@Prefer Memory
public void methodA( ){
...
}
}
``` c) Performance preference propagation policy may be written in well-defined APIs, such that the application developers can set and change performance preference by calling these APIs.

Then, in a process block 208, the class is called to perform performance configuration according to the performance preference propagation policy.

Different manners of specifying policy results in different embodiments. Taking ArrayList as an example, parameters may be configured into ArrayList according to a different manner in the previous step. When the application is running, specific parameters may be used automatically according to context to set the used ArrayList. A possible implementation is to use an Instrumentation function of Java to modify binary code, and enable program to follow the defined rule at runtime. For example, Configuration file or annotation is read, and information defined by the application developers is extracted. For example, a global setting of Prefer Memory, and MethodB needs to apply Prefer Speed.

MethodB is used as Instrumentation. Code is added in the forefront of the method, and then the previous setting is obtained—Prefer Memory; and current setting is changed—Preference=Preference Speed; and code is added in the end of the method to reset Preference to the previous setting, that is, it returns to Prefer Memory. When the application program is running, ArrayList is constructed initially according to the manner of Prefer Memory. Each time MethodB is encountered, Prefer Speed is automatically applied and a different ArrayList is constructed in this manner, thereby achieving fine-grained control.

Specific embodiment according to an embodiment of the invention is as follows.

1. Current performance preference configuration is maintained by generating a ThreadLocal variable. ThreadLocal variable is a thread local variable, and its change is only visible to current thread.

ThreadLocal<RuntimePolicy>policy=new
   ThreadLocal<RuntimePolicy>( ); policy.set(currentPolicy);
. . .

2. Necessary information is implemented by analyzing policy configuration file or searching the read annotation in the class. Wherein, reading of a policy configuration file or searching for the annotation in the class may be performed by general APIs that are well-known for those skilled in the art, and are omitted for purpose of brevity.

3. Implementation of a relevant class may be achieved by directly modifying binary code of the relevant class utilizing an Instrumentation approach:

. . .

ClassWriter writer=new ClassWriter(ClassWriter.COMPUTE_MAXS);
ClassVisitor cv=new PerformanceAwarenessClassAdapter(writer, className);
ClassReader reader=new ClassReader(classfileBuffer); reader.accept(cv, 0);
classfileBuffer=writer.toByteArray( );

. . .

According to another embodiment of the invention, when performance preference propagation policy is specified, the specified performance preference propagation policy may be associated with a performance environment where the application is at runtime, so as to adapt change of the performance environment where the application is at runtime. Thus, when the application is running, performance preference propagation policy associated with the performance environment is determined according to the performance environment where the application is running. When the application calls the class, the class is enabled to be performance-aware according to the performance preference propagation policy associated with the performance environment, thereby achieving the fine-grained performance configuration of application.

Figure 3:
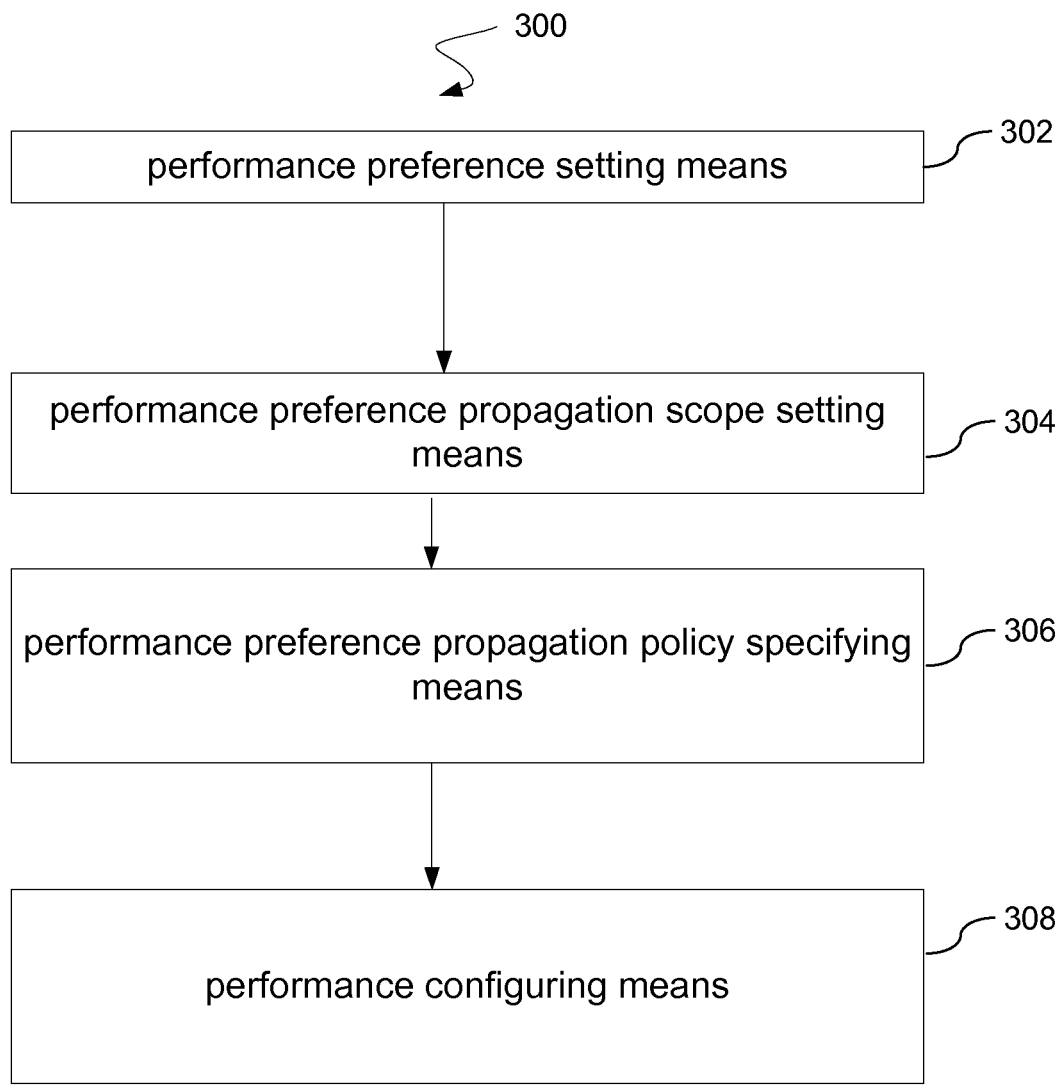
FIG. 3 illustrates a system block diagram of a system 300 for achieving fine-grained performance configuration of an application according to one embodiment of the invention.

FIG. 3 shows a system block diagram of a system 300 for achieving the fine-grained performance configuration of the application according to one embodiment of the invention. Wherein, system 300 according to an embodiment of the invention comprises: performance preference setting means 302 configured to set the at least one performance preference for performance-sensitive class in the application; performance preference propagation policy specifying means 306 configured to specify performance preference propagation policy of the class in the application based on at least one performance preference; and performance configuring means 308 configured to call the class to perform performance configuration for application according to the performance preference propagation policy.

According to another embodiment of the invention, the performance preference setting means 302 may set the at least one performance preference by setting different parameter values.

According to another embodiment of the invention, the system 300 may further comprise a performance preference propagation scope setting means 304, and the performance preference propagation scope setting means 304 sets propagation scope of the at least one performance preference for at least one performance preference. Further, the performance preference propagation policy specifying means 306 further specifies performance preference propagation policy of the class in the application based on the propagation scope of the at least one performance preference.

According to another embodiment of the invention, the performance preference propagation policy may be associated with the performance environment where the application is at runtime.

According to another embodiment of the invention, the performance configuring means 308 further comprises: means configured to, according to performance environment where the application is running, determine performance preference propagation policy associated with the performance environment; and means configured to call the class based on the performance preference propagation policy associated with the performance environment.

According to another embodiment of the invention, the performance preference propagation policy specifying means 306 may write the performance preference propagation policy into one policy configuration file of the class.

According to another embodiment of the invention, the performance preference propagation policy specifying means 306 may write the performance preference propagation policy into code annotation parts of the application.

According to another embodiment of the invention, the performance preference propagation policy specifying means 306 may set the performance preference propagation policy utilizing predefined APIs.

According to another embodiment of the invention, the propagation scope of the performance preference comprises at least one of global scope, class scope, method scope, instance scope.

Although a tool class ArrayList in Java is used as an example to explain in the description, those skilled in the art should appreciate that, various embodiments of the invention can be applied not only to all Java class libraries and Java classes, but also can be used in object-oriented language class libraries and development kits such as C++, C# etc. and aren't limit to ArrayList described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

While the apparatus and method have been described in terms of what are presently considered to be the most practical and preferred embodiments, it is to be understood that the invention need not be limited to the disclosed embodiments. The invention is intended to cover various modifications and similar arrangements included within the spirit and scope of the claims, the scope of which should be accorded the broadest interpretation so as to encompass all such modifications and similar structures. The present invention includes any and all embodiments of the following claims.

We claim:

1. A computer program product for achieving performance configuration of an application, the computer program product comprising:
    a computer readable storage medium having computer readable program code embodied therewith, the computer readable program code comprising:
    computer readable program code configured to set an at least one performance preference for a performance-sensitive class in the application;
    computer readable program code configured for specifying a performance preference propagation policy of the class in the application based on the at least one performance preference, wherein the policy indicates a scope for applying a performance configuration to the class for the at least one performance preference; and
    computer readable program code configured for calling the class to perform performance configuration for the application according to the scope indicated by the performance preference propagation policy.

2. The computer program product of claim 1, wherein the computer readable program code is also configured to set the at least one performance preference by setting a different parameter value.

3. The computer program product of claim 1, wherein the computer readable program code is also configured for specifying the performance preference propagation policy of the class in the application by writing the performance preference propagation policy into a policy configuration file of the class.

4. The computer program product of claim 1, wherein the computer readable program code is also configured for specifying performance preference propagation policy of the class in the application by writing the performance preference propagation policy into a code annotation part of the application.

5. The computer program product of claim 1, wherein the computer readable program code is also configured for specifying performance preference propagation policy of the class in the application by setting the performance preference propagation policy in a predefined API.

6. The computer program product according to claim 1, wherein the computer readable program code is also configured to set a performance preference propagation policy associated with a performance environment where the application is at runtime.

7. The computer program product of claim 1, wherein the computer readable program code is also configured to set a propagation scope of the at least one performance preference;
computer readable program code is also configured to set a performance preference propagation policy of the class in the application based on the set at least one performance preference;
computer readable program code specifying performance preference propagation policy of the class in the application based on the propagation scope of the at least one performance preference.

8. The computer program product of claim 7, wherein the computer readable program code is also configured for specifying the performance propagation scope of the class in the application by setting at least one of global scope, class scope, method scope, and instance scope.

9. A method for achieving performance configuration of an application, comprising:
setting an at least one performance preference for a performance-sensitive class in the application;
specifying a performance preference propagation policy of the class in the application based on the at least one performance preference, wherein the policy indicates a scope for applying a performance configuration to the class for the at least one performance preference; and
calling the class to perform performance configuration for the application according to the scope indicated by the performance preference propagation policy.

10. The method according to claim 9, further comprising:
utilizing a different parameter value for setting the at least one performance preference.

11. The method of claim 9, further comprising:
specifying the performance preference propagation policy of the class in the application by writing the performance preference propagation policy into a policy configuration file of the class.

12. The method of claim 9, further comprising:
specifying the performance preference propagation policy of the class in the application by writing the performance preference propagation policy into a code annotation part of the application.

13. The method of claim 9, further comprising:
specifying the performance preference propagation policy of the class in the application by setting the performance preference propagation policy in a predefined API.

14. The method of claim 9, further comprising:
setting the performance preference propagation policy associated with a performance environment where the application is at runtime.

15. The method of claim 9, further comprising:
setting a propagation scope of the at least one performance preference;
setting a performance preference propagation policy of the class in the application based on the set at least one performance preference;
specifying performance preference propagation policy of the class in the application based on the propagation scope of the at least one performance preference.

16. The method of claim 15, further comprising:
specifying the performance propagation scope of the class in the application by setting at least one of global scope, class scope, method scope, and instance scope.

17. A system for achieving performance configuration of an application, comprising:
a processor;
an application with an at least one performance-sensitive class in the application running on the processor;
an interface that sets at least one performance-sensitive performance preference for the at least one performance-sensitive performance-sensitive class in the application;
an interface that sets a performance preference propagation policy of the at least one class in the application based on the at least one performance preference, wherein the policy indicates a scope for applying a performance configuration to the class for the at least one performance preference; and
the application is configured to use the interface that sets the performance preference propagation policy of the class for performing performance configuration for the application according to the scope indicated by the performance preference propagation policy.

18. The system according to claim 17, wherein, the performance preference setting interface is configured to set the at least one performance preference by setting different parameter values.

19. The system of claim 17, wherein, the performance preference setting interface is configured to set the at least one performance preference by writing the performance preference propagation policy into a policy configuration file of the class.

20. The system of claim 17, wherein, the performance preference setting interface is configured to set the at least one performance preference by writing the performance preference propagation policy into a code annotation part of the application.

21. The system of claim 17, wherein, the performance preference setting interface is configured to set the at least one performance preference by: setting the performance preference propagation policy utilizing a predefined API.

22. The system of claim 17, wherein, the performance preference propagation policy interface is configured to utilize a performance environment of where the application is at runtime.

23. The system of claim 17, wherein, the application configured with the performance setting preference interface that sets a propagation scope of the at least one performance preference;
is configured to set a performance preference propagation policy of the class in the application based on the set of at least one performance preference; and is configured to set a performance preference propagation policy of the class in the application based on the propagation scope of the at least one performance preference.

24. The system of claim 23, wherein the application is configured to set the performance propagation scope of the class with an interface configured to set at least one of global scope, class scope, method scope, and instance scope.

* * * * *